United States Patent [19]

Wakeman

[11] 3,861,795

[45] Jan. 21, 1975

[54] CASSETTE FOR A SOUND SLIDE PROJECTOR

[75] Inventor: Alfred W. Wakeman, Durham, Conn.

[73] Assignee: Kalart Victor Corporation, Plainville, Conn.

[22] Filed: July 25, 1972

[21] Appl. No.: 274,909

[52] U.S. Cl. .................... 353/120, 242/74, 242/194, 353/15

[51] Int. Cl. .................... G03b 23/02

[58] Field of Search ....... 242/194, 193, 54.1, 107 R, 242/107.5, 107.1, 107.15, 204, 202, 201, 191, 197, 199, 200; 274/4 F; 353/118, 120, 117, 15; 179/100.2 Z; 352/72, 78 R

[56] References Cited

UNITED STATES PATENTS

| | | | |
|---|---|---|---|
| 2,477,146 | 7/1949 | Scherbatskoy | 242/54.1 |
| 2,645,432 | 7/1953 | Griffitts | 242/107 R |
| 3,408,139 | 10/1968 | Schwartz et al. | 274/4 F |
| 3,469,513 | 9/1969 | Hansen et al. | 353/118 X |
| 3,684,208 | 8/1972 | Larsen | 242/194 |
| 3,685,893 | 8/1972 | Castedello | 242/204 |
| 3,690,590 | 9/1972 | Bennett et al. | 242/194 |

*Primary Examiner*—George F. Mautz
*Attorney, Agent, or Firm*—Hane, Baxley and Spiecens

[57] ABSTRACT

A cassette for a sound slide projector has in a casing a first compartment and a second compartment. The first compartment accommodates a tape reel mechanism and is accessible through recesses for forward winding and rewinding of the tape and for recording a message on the tape or playing back such message from the tape. The reel mechanism comprises a tape supply reel and a tape take-up reel rotatably disposed in superimposition and spring means for automatically and continuously tensioning the length of tape between the two reels. The second compartment accommodates the slide and has in a wall portion adjacent to said compartment a slot for removing the slide from the cassette into a presentation position and for returning the slide into this compartment upon projection of the slide and play-back of the tape in the first compartment.

11 Claims, 17 Drawing Figures

CASSETTE FOR A SOUND SLIDE PROJECTOR

The present invention relates to a cassette accommodating a magnetic tape and more particularly to a cassette accommodating both a tape and a slide for playback from the tape or recording thereon and for projection of the slide by means of a sound slide projector, and more particularly to a sound slide cassette for use in a projector as disclosed in copending Application Ser. No. 757,023, filed Sept. 3, 1968, and matured in U.S. Pat. No. 3,561,856, issued Feb. 9, 1971, the term "magnetic tape" being intended to encompass also sound carriers such as magnetizable wires.

BACKGROUND

A projector according to the afore-referred to patent is designed for use with cassettes which accommodate a slide and a magnetic tape having recorded thereon a message or for recording a message. The projector has means for conveying a plurality of such cassettes, one by one, to a presentation position in which the optical assembly of the projector is activated to project the respective slide and the sound assembly to play back or to record a message. Projection of a slide entails that the same be moved from the cassette to a projection position and returned into the cassette at the end of the presentation. The projector also requires that the sound head and the erase head of the projector can coact with the tape in the cassette. A forward drive mechanism common for all cassettes placed in the projector effects forward drive of the tape during playback or recording and a rewind mechanism also common for all the cassettes effects rewind of the tape upon completion of the play-back of the recorded message or recording of a message.

There are known cassette assemblies in which the tape supply reel and the tape take-up reel are independently driven. There are further known assemblies in which the two reels are coupled for driving both reels by one drive means, such as a capstan. The present invention relates to the latter type of assemblies.

Copending Application Ser. No. 864,697, filed Oct. 8, 1969, and issued as U.S. Pat. No. 2,685,893 shows a cassette in which the supply reel and the take-up reel are coupled by a friction coupling such as a flexible rim on one reel engageable with a suitable usually rigid rim on the other reel.

Extensive tests and practical experience have shown that a friction coupling of this kind is not always sufficiently reliable. Impurities such as dust or tape particles may become lodged between the two engaging rims, thereby causing slipping of the rims and thus of the reels relative to each other. Moreover, the flexible rim, usually a rubber rim, may lose its flexibility due to fatigue of the material. The result of slippage between the two reels relative to each other tends to be that the length of tape between the two reels becomes slack and may even form a loop. Such slackness of the tape may cause entanglement of the tape with driving elements or the heads of the projector in the tray of which the cassettes are inserted, or even break the tape. Moreover, slackness of the tape may adversely affect the sound quality of play-back or of recording on the tape.

THE INVENTION

It is a broad object of the invention to provide a novel and improved cassette of the general type above referred to in which two reels are coupled by coupling means which are not subject to the aforepointed out shortcomings and which assure that the length of tape between the two reels remains always taut.

A more specific object of the invention is to provide a novel and improved cassette of the general kind above referred to in which the two reels are coupled by a torsion spring which always biases the two reels as a tape is being wound from one reel upon the other toward an angular position in which the length of tape between the two reels is sufficiently tensioned to avoid the aforepointed out shortcomings.

Another more specific object of the invention is to provide a novel and improved cassette of the general type above referred to in which a torsion spring is interposed between the two reels and so biased that the torsional force of the spring always tends to turn the two reels in opposite direction, without winding itself to any substantial extent as the reels turn or are at a standstill.

Still another more specific object of the invention is to provide a novel and improved cassette in which the reels are coaxially disposed and the hubs of the reels form bearings for each other.

It is also a broad object of the invention to provide a novel and improved cassette of the general type above referred to which includes release means for automatically releasing the slide in the cassette when the cassette is inserted into the tray of the projector so that the slide can move into the projection position when the respective cassette reaches the presentation position in the projector as above explained, and for automatically regripping the slide when the cassette is removed from the tray.

Another more specific object of the invention is a novel and improved cassette of the general kind above referred to in which the release means are in the form of a leaf spring which automatically grips a slide inserted into the cassette and releases the slide in response to pressure exerted upon the spring by release components on the tray when the cassette is placed in the same.

Still another object of the invention is to provide a novel and improved cassette of the general kind above referred to which includes cushioning means for preventing or at least greatly reducing the danger of breaking of the tape by the abrupt and sharp pull experienced by the tape at the end of a fast rewind of the tape.

A further object of the invention is to provide a novel and improved fastening means for attaching the tape ends of the reels in a cassette of the general kind above referred to.

SUMMARY OF THE INVENTION

The afore-pointed out objects, features and advantages and other objects, features and advantages which will be pointed out hereinafter, are obtained by providing a hollow casing including wall openings to expose tape within the cassette for coaction with tape driving means and a sound or erase head in the projector for which the cassette is designed. The casing is divided into two compartments, one for accommodating the reel assembly and the second for accommodating a slide. The slide compartment includes in one of its side walls a slot through which the slide can drop into the presentation position and through which it is returned into the casing, as has been more fully described in the afore-referred to U.S. Pat. No. 3,561,856.

The reel assembly comprises a tape supply reel and a tape take-up reel coaxially disposed and rotatable about a pivot pin within the first compartment of the casing. The hubs of the reels are so shaped that they form bearings for each other, thereby effectively avoiding wobbling of the reels as the same rotate. The two reels are coupled by a torsion spring which is so loaded that it continuously biases the reels for rotation in opposite direction, thereby tensioning the length of tape between the two reels, irrespective whether the tape is wound from the supply reel upon the take-up reel or vice-versa, and also when both reels are at a standstill.

To effect release of the slide in the cassettes when a cassette is placed in the tray of the projector, a leaf spring is fitted in a casing wall of the compartment for the slide. This spring is so biased that it retains the slide with a frictional grip and when pressure is applied to a part of the spring protruding from the casing by components provided for the purpose on the tray, the spring will release the retained slide for gravity drop through the slot in the casing. The slide, even though it is released by the spring, remains in its cassette since it is retained by the tray as the cassette moves toward or away from the presentation position and is thus free to drop out of the slot in the casing of a cassette reaching the presentation position. Upon return of the slide into its compartment by the return means provided for the purpose in the projector and removal of the cassette from the tray, the spring will again automatically grip the slide.

The afore-referred to cushioning of the tape at the end of fast rewind is effected by providing on the take-up reel a guide means which lengthens the effective distance between the point at which the respective tape end is attached within the take-up reel and the idler which guides the tape to the take-up reel. Such lengthening of the distance and thus also of the portion of tape between the idler and the reel cushions the shock experienced by the tape when the take-up reel is abruptly halted when the end of the tape on that reel is reached. Such shock tends to cause damage to the tape, or even a break thereof.

BRIEF DESCRIPTION OF THE DRAWING FIGURES

In the accompanying drawings, preferred embodiments of the invention are shown by way of illustration and not by way of limitation.

Figure 2:
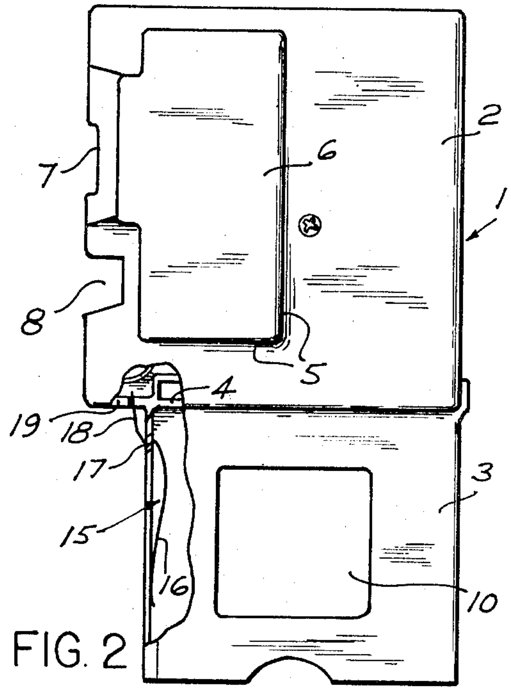
FIG. 2 is an elevational side view similar to FIG. 1, but showing a different part of the cassette in section.

Referring now to the embodiment of a cassette according to the invention as exemplified in the figures, the cassette comprises a hollow casing 1 made of a suitable plastic such as polystyrene, but other suitable materials may also be used. The casing is generally of the type disclosed in detail in the aforementioned application, Ser. No. 864,697, filed Oct. 8, 1968 now U.S. Pat. No. 3,865,893 that is, it comprises two complementary parts. It includes two compartments 2 and 3, compartment 2 serving to accommodate the reel assembly, as will be more fully described hereinafter and compartment 3, a slide. The two compartments are separated by a partitioned wall 4 indicated in FIG. 2. Compartment 2 may be further subdivided by partition walls 5 and the subcompartment 6 thus formed may be raised above the level of the remaining part of the compartment as it is indicated in FIG. 2. One of the side walls of compartment 2 includes cutouts or recesses 7 and 8, recess 8 permitting coaction of the projector according to the aforesaid U.S. Pat. No. 3,561,856 with the tape and recess 7 permitting coaction of the tape with the sound head or the erase head and the rewind assembly of the projector.

The slide compartment 3 perferably includes in its side wall a window or picture gate 10 and the casing has in its bottom edge a slot 11, through which a slide may be inserted into compartment 3 and through which it may drop when released, as described in detail in the afore-referred to patent.

It should be pointed out in this connection that insertion of a slide into slide compartment 3, removal therefrom for a presentation and return of the slide upon completion of the representation should be visualized as being effected in the same manner as has been described in the afore-referred to U.S. Pat. No. 3,561,856 and application Ser. No. 864,687 now U.S. Pat. No. 3,865,893.

Referring now to the slide retaining and release means according to this invention, these release means comprise a leaf spring 15. This spring extends with part 16 of its length into the casing through an opening 17 in a casing edge adjacent to the edge of a slide inserted into compartment 3. The remaining part 18 of the spring protrudes from the casing and extends with its tip into a slot 19 formed in a casing part overhanging the casing part accommodating the slide, as it is clearly shown in FIGS. 1 and 2. Spring part 16 is concavely curved with respect to the adjacent casing wall and so that it will pressure engage the adjacent edge of a slide inserted into compartment 3, thereby retaining such slide in the compartment. As it is shown in FIG. 2, the end portion of spring part 16 abuts against the casing wall, thereby retaining the spring in a position in which it can exert a bias against the slide edge.

Protruding spring part 18 should be visualized as coacting with a release means in the projector in a manner such that pressure exerted against spring part 18 will cause a corresponding flattening of curved spring part 16, thereby freeing the slide from the grip by spring. Conversely, if there is no pressure against spring part 18, spring part 16 will automatically grip a slide upon insertion thereof into compartment 3. The afore-referred to slot 19 in the casing wall limits the distance through which spring part 18 can be displaced when pressure is applied thereto.

As it is shown in FIG. 2, the spring portion within the casing wall opening 17 is so shaped that it prevents slipping of the spring into or out of the casing. As it is further apparent from FIG. 2, the spring portion within opening 17 constitutes a fulcrum for the spring.

Figure 1:
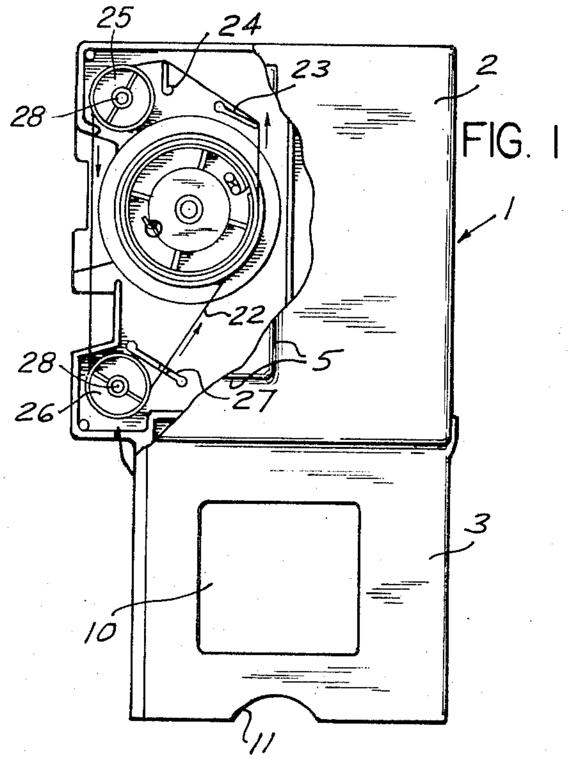
FIG. 1 is an elevational side view, partly in section, of a cassette according to the invention.

Referring now to the reel assembly, this assembly comprises two reels 20 and 21. For purpose of the description, reel 20 is the take-up reel and reel 21 the supply reel, but as it is evident, the upper reel 21 could also be the take-up reel and reel 20 the supply reel. Magnetic tape 22, such as Mylar tape is wound upon the two reels in a conventional manner with the ends of the tape suitably secured to the reels, as will be more fully described hereinafter. Referring to FIG. 1, the length of tape between the two reels is guided over guide ribs 23, 24, idlers 25, 26 and guide rib 27. The guide ribs extend from a side wall of the casing, preferably molded thereto and idlers 25 and 26 are rotatable about pivot pins 28, also preferably molded to the same side wall of the casing. As it is clearly shown in FIG. 1, the idlers guide the tape along a straight path past recesses 7 and 8.

As previously pointed out, it is an essential object of the invention that the length of tape traveling from one reel to the other is always held taut.

Figure 3:
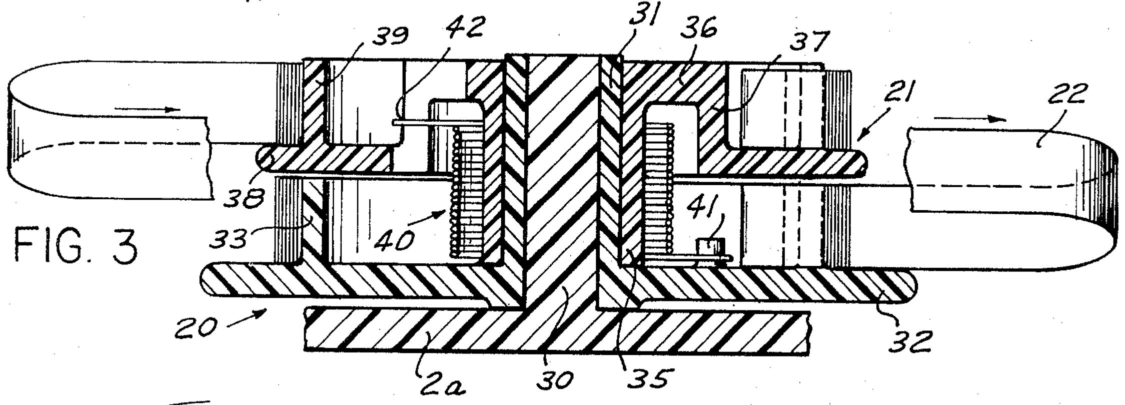
FIG. 3 is a diagrammatic elevational sectional view of the reel assembly of the cassette on an enlarged scale.

Referring now to FIG. 3, the two reels are superimposed and coaxially rotatable about a pivot means including a pivot pin 30 protruding from a wall portion 2*a* of a side wall of casing compartment 2, preferably molded thereto. Reel 20 has a tubular hub 31 which is rotatably seated on pin 30. The hub at its end near wall portion 2*a* is formed with a radially extending peripheral flange 32 from which extends coaxially with the rotational axis of hub 31, a peripheral wall 33. The circumference of wall 33 constitutes the surface upon which the tape on reel 20 is wound.

Reel 21 has a tubular hub 35 which is rotatably seated on hub 31. Hub 35 is continued by a radially extending peripheral flange 36 and an axially directed wall portion 37 which mounts a radially extending peripheral flange 38. The latter flange mounts an axially directed peripheral wall 39, which similar to wall 33, provides the circumferential surface for winding the tape. As is clearly shown in FIG. 3, a gap is left between the upper end of wall 33 and the bottom side of flange 38 to obtain minimal friction between the reels. The diameters of walls 33 and 38 are substantially equal as it is shown. As it is now evident, pin or arbor 30 provides a bearing for hub 31 and this hub in turn provides a bearing for hub 35.

FIG. 3 indicates that about one-half of the tape is wound on reel 20 and the other half on reel 21.

The two reels are drivingly coupled by a loaded torsion spring 40. The turns of the spring are wound about hub 35 and are thus coaxial with hub 31 and pin 30. One end of the spring is secured to reel 20 as is indicated by a lug 41. The other end of the spring is suitably fastened to reel 21 as it is indicated at 42. The spring may be a light and fairly soft spring needing only few windings.

Figure 4:
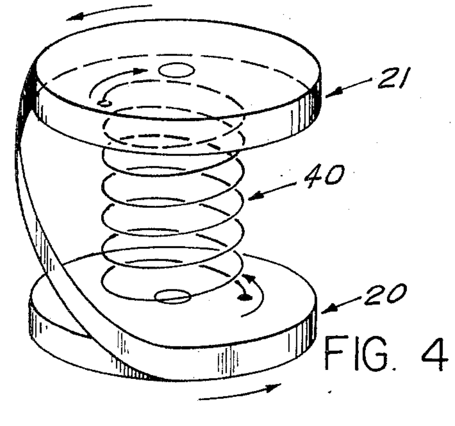
FIG. 4 is a diagrammatic perspective view of the torsion spring coupling the two reels of the reel assembly.

Turning now to diagrammatic FIG. 4, this figure shows that the spring, due to its inherent torsion action, biases the two reels in opposite rotational direction. FIG. 4 shows by arrows that the two reels will unidirectly rotate as the tape is wound from one reel upon the other, counterclockwise rotation being indicated. As is indicated, the upper end of the spring will bias reel 21 in clockwise direction and the lower end biases reel 20 in counter-clockwise direction.

As it is now evident, the bias imposed by the spring upon the reels will continuously hold taut the length of tape extending between two reels and especially the tape portion between the two idlers.

Moreover, tests and calculation have shown that the spring loading changes very little as tape is being wound from one reel upon the other. More specifically, it has been found that it takes about forty turns of the reels to produce one turn of the spring. Forty turns of the reels are more than adequate for winding tape of a length such as is generally used in cassettes of the kind here involved from one reel upon the other.

Figure 5:
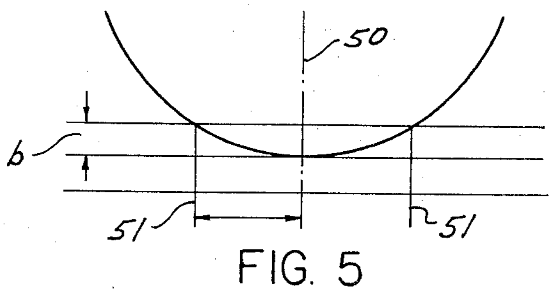
FIG. 5 is a graph diagrammatically showing variations in the tape tension as the same is wound from one reel upon the other.

Referring now to FIG. 5 which shows the variations of the spring loading that occur when the tape is wound from one reel upon the other, line 50 represents the medium condition, that is, the length of tape is equal on both reels and lines 51 represent the peak of diameter differential, that is, all the tape is either on one or the other reel. The distance *a*, that is, the peak diameter differential may be approximated by the equation:

number of windings = length of tape/circumference of reels

The variations in the tension of the tape are represented by the distance *b*. As it is evident, the tape tension varies little between the medium condition represented by line 50 and the peak condition represented by lines 51. Hence, the tautness of a tape having a length as is customarily used in cassettes and similar articles, is sufficiently uniform for all practical purposes.

Figures 6, 7, 8:
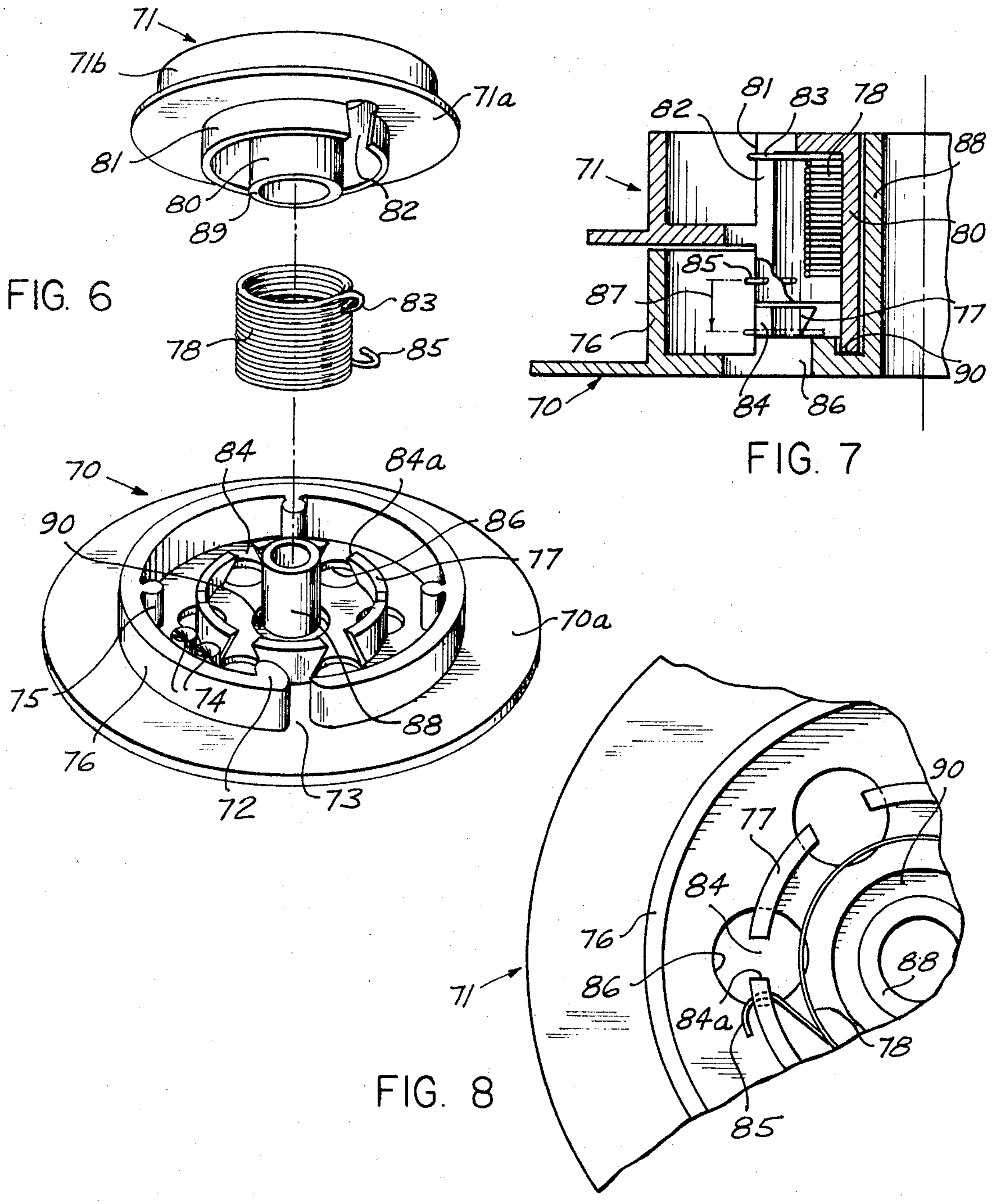
FIG. 6 is an exploded detail view of a modified reel assembly according to the invention.
FIG. 7 is a fragmentary sectional view of the assembly of FIG. 6 after assembly.
FIG. 8 is a fragmentary plan view of the take-up reel of FIG. 6 on an enlarged scale.

Referring now to FIGS. 6, 7 and 8, these figures show a reel assembly including a take-up reel 70 and a supply reel 71. The configurations of these reels are in principle the same as the configurations of the reels shown in FIG. 3 and described in connection therewith, that is, take-up reel 70 has a peripheral flange 70*a* extending from a tubular hub or barrel 88. Flange 70*a* mounts a peripheral wall 76. This wall includes a tape entrance 73 formed with an arcuate wall portion 72 to avoid damage to the tape when the take-up reel is abruptly stopped at the end of fast rewind. The respective end of tape 95 is attached by fastening means 74 within the space circumscribed by wall 76 as will be more fully described hereinafter. There are also shown within the space circumscribed by wall 76 several circumferentially spaced bosses 75, preferably provided as good molding practice.

Supply reel 71 is formed with a flange 71*a* from which extends a peripheral wall 71*b*. As described in connection with FIG. 3, flange 70*a*, wall 76 and flange 71*a* and wall 71*b*, respectively, serve to support and guide the tape as the same is being wound from one reel to the other.

As also described in connection with FIGS. 3 and 4, the two reels are drivingly coupled by a loaded torsion spring 78. There is shown in FIGS. 6 and 7 a coil spring terminating at each end by hooks 83 and 85 which serve to couple the spring to reels 70 and 71. As it is shown in FIG. 7, the spring encompasses tubular hub or barrel 80. Hook 83 is attached to supply reel 71 by means of a peripheral wall 81 which extends from flange 71*a* on the side of the flange opposite to flange 71*b* and includes a keystoned or undercut slot 82 in order to retain thereon spring hook 83. The second spring hook 85 is fastened to take-up reel 70 by means of a castellated wall 77 provided within the space circumscribed by peripheral wall 76. Wall 77 is formed with a plurality of slots 84, the side walls 84*a* of which are keystoned or undercut as it is clearly shown in FIGS. 6 and 8. Adjacent to each cut-out 84, flange 70*a* includes a hole 86 as also shown in FIGS. 6 and 8. These holes serve for insertion of a suitable small hooked tool to pull hook 85 over one of the keystoned side walls 84*a*, thus retaining hook 85 in position.

To assemble reels 70 and 71 to the position of FIG. 7, supply reel 71 is inverted, spring 78 is dropped in with its hook 83 caught up in slot 82. The spring is then slightly loaded by winding it — about two revolutions are generally sufficient — by engaging hook 85 with a small hooked tool and pushing it into one of the slots 84. Reel 71 is not placed on reel 70 with tape 95 already wound upon reel 71 and secured thereto, which will be more fully described hereinafter. One reel is turned until the tape is taut between the two reels. The reel is then rotated in the opposite direction until one of the holes 86 in the take-up reel is lined up with slot 82 in the supply reel. Since there are several circumferential holes, six holes being shown, the angular movement required to line up one of the holes 86 with slot 82 is bound to be small. Hence, variations in tension between the two reels due to the relative turning thereof is correspondingly insignificant. While the two reels are in the aforedescribed position of alignment, the afore-referred to small hooked tool is passed through the aligned hole 86 and used to pull hook 85 through the distance 87 and upon the respective slot 84. Due to the keystoned side walls 84*a* of the castellations the hook is automatically retained. The two reels are thus biased by the spring to assure that the length of tape extending between the two reels is continuously held taut as previously described (see FIGS. 1 and 4).

Figure 9:
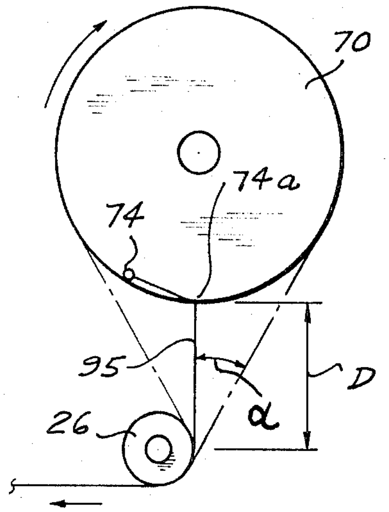
FIG. 9 is a diagrammatic view of the attitude of the tape during the final stage of a fast rewind from a conventional take-up reel.
Figure 10:
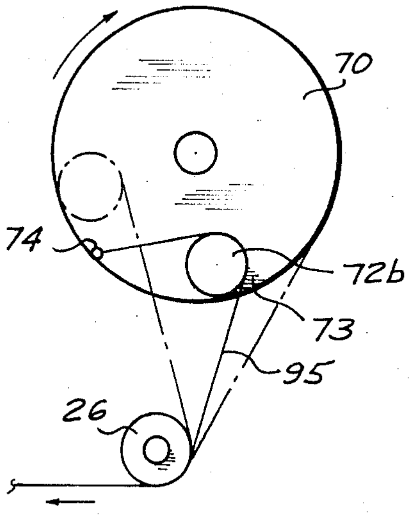
FIG. 10 is a diagrammatic view similar to FIG. 9, but showing the attitude of the tape during the final stage of the rewind from the take-up reel according to the invention.
Figure 11:
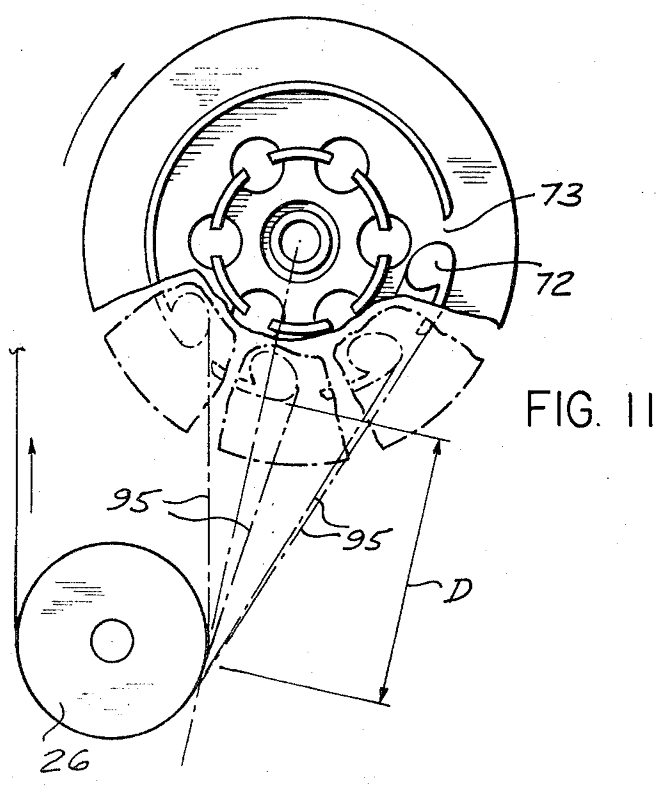
FIG. 11 is a plan view on the take-up reel of FIG. 6 showing the attitude of the tape during the final stage of the rewind operation.

Referring now to FIGS. 9, 10 and 11, as previously stated fast rewind of the tape from the take-up reel to the supply reel presents a problem in that there is danger of damage to the tape at the end of fast rewind (the speed of which is such that it is usually completed in a very short time such as one second).

Tape 95 and thus also supply reel 70 must decelerate from full rewind speed to full stop within an angular rotation of the reel from the point of initial tangency to a point 74*a*, that is, within an angle $\alpha$ of less than 90°. Point 74*a* represents the point at which the tape leaves reel 70. The length of tape available between point 74*a* and idler 26 is designated by D. The reel continues to turn past the run-out position of the tape (as shown in full lines) approximately into position (as shown in dashed-dotted lines) in which tape is wound about part of the left hand side of the reel. Such back-winding of the tape causes an abrupt reversal of the tape travel from forward to reverse and corresponding reversal of the rotational direction of reel 70. It is this inherent inertia of the reel which tends to cause breakage or at least damage to the tape.

According to the invention, the danger of damage to the tape is for all practical purposes eliminated by the structure shown diagrammatically in FIG. 10 and in detail in FIG. 11. Referring first to FIG. 10, this figure shows a curved guide member shown as a circular guide 72*b* adjacent to entrance slot 73, that is, between entrance slot 73 and fastening means 74. This guide increases the available angle of rotation in which full deceleration occurs and thus the period of time available for one deceleration. The dashed-dotted lines in FIG. 10 indicate the increase in the length of tape now available between fastening means 74 and idler 26. This additional length of tape availble due to the guide is at a maximum precisely at the point of maximal deceleration (about 90° to tangency). It has been found by tests that the provision of the curved guide greatly increases the damping or cushioning effect at the critical moment thereby correspondingly reducing the danger of damage to the tape.

FIG. 11 shows in detail three angular positions of a take-up reel equipped with the cushioning guide 72 described in connection with FIG. 10. The different positions occupied by guide 72 are shown with dashed-dotted lines.

Figure 12:
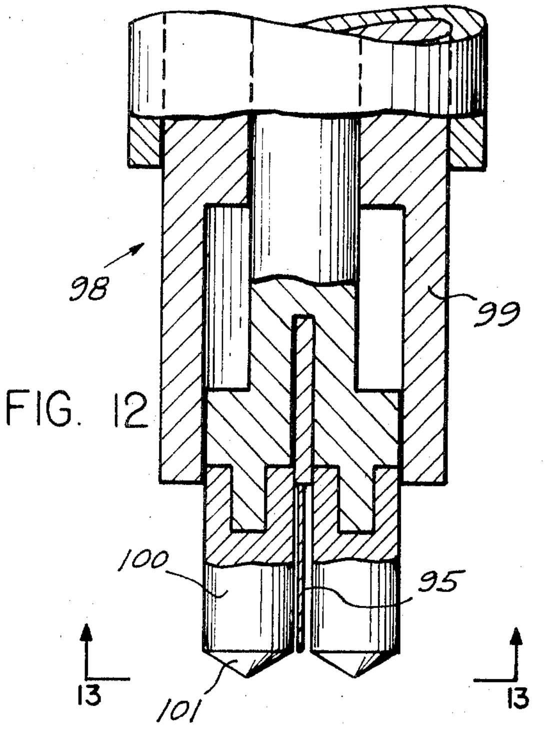
FIG. 12 is a fragmentary elevational view of a tool for fastening the tape ends to the take-up reel and the supply reel of the reel assembly.
Figure 14:
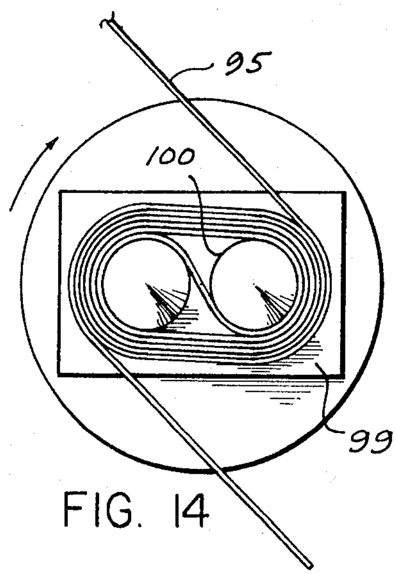
FIG. 14 is a bottom view of FIG. 12 on an enlarged scale with a tape end wound on the tool.
Figure 13:
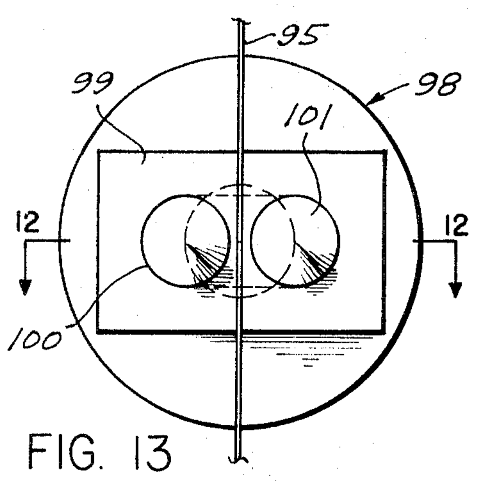
FIG. 13 is a bottom view of FIG. 12 as seen in the direction of arrows 13.
Figure 15:
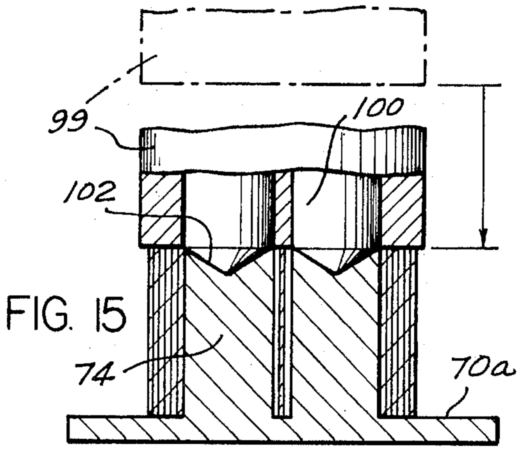
FIG. 15 is an elevational sectional view showing the tool and part of a reel at the moment of transfer of the wound tape end from the tool to the reel.

Referring now to FIGS. 12 to 17, these figures show the mounting of the tape ends on reels 70 and 71. As it is clearly shown for take-up reel 70, there are provided as fastening means 74 two cylindrical lugs which extend from flange 70*a* within the space circumscribed by peripheral wall 76. These lugs are sufficiently spaced to accommodate tape therebetween. The lugs are a fixed part of a device for attaching the tape ends fo the reels. The other part of the device is a tool 98. This tool comprises a sleeve 99 in which a pair of lugs 100 are slidably mounted. These lugs have substantially the same peripheral outline as lugs 74. The tool is used by slipping the tape end to be fastened between the two lugs 100 as it is indicated in FIGS. 12 and 13. The entire tool is then rotated about its lengthwise axis to form an adequate number of windings on lugs 100. As it is shown in FIG. 14, three turns are generally sufficient to anchor the tape end on lugs 100. The now loaded tool is placed upon lugs 74 on take-up reel 70 so that the lugs 74 on the reel are in alignment with the lugs 100 on the tool. To facilitate such alignment, coacting protrusions 101 and depressions 102 at the facing lug ends are preferably provided. Sleeve 99 is now lowered from the position of FIG. 12 in which the lugs 100 protrude from the bottom end of the sleeve into a position such that the lugs are retracted into the sleeve. As a result, the tape windings on lugs 100 are automatically transferred to lugs 74 on reel 70 as it is shown in FIG. 15. The tool is now removed and readied for the next operation.

Figure 16:
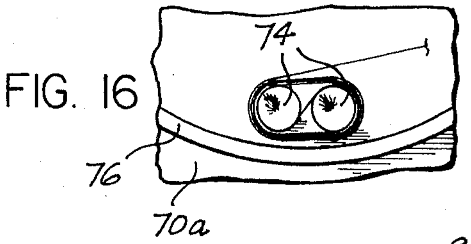
FIG. 16 is a fragmentary plan view of the reel with the tape end attached thereto.
Figure 17:
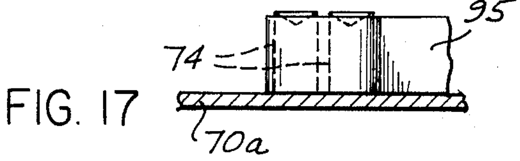
FIG. 17 is an elevational side view, partly in section, of FIG. 16.

FIGS. 16 and 17 show the tape safely anchored to reel 70. The other tape end is fastened in the same manner and by the same tool to supply reel 71, which should be visualized as also having a pair of lugs 74 provided within the space circumscribed by peripheral wall 71*b*.

Tool 98 should be visualized as part of a jig and so arranged that the aforedescribed tape winding and tape transfer operations can be carried out mechanically and in rapid succession. Jig designs of this kind are obvious to a person skilled in the art and do not constitute part of the present invention.

While the invention has been described in detail with respect to certain now preferred examples and embodiments of the invention, it will be understood by those skilled in the art, after understanding the invention, that various changes and modifications may be made without departing from the spirit and scope of the invention, and it is intended therefore, to cover all such changes and modifications in the appended claims.

What is claimed is:

1. A cassette for a sound slide projector, said cassette comprising:

a casing having a top wall, a bottom wall and two side walls and including an upper first compartment for accommodating therein a tape reel assembly and a lower second compartment for accommodating therein a slide, a side wall portion of the casing juxtaposed to the first compartment including a first recess for making the tape accessible for coaction with a tape driving means and a second recess spaced apart from the first recess for making the tape accessible for coaction with a sound head or an erase head, one of the wall portions of the casing adjacent to the second compartment including an elongate slot for removal of a slide out of the second compartment and return of the slide into the second compartment;

a tape reel assembly including an elongate pivot means with the first compartment of said casing extending from a wall portion thereof; a tape supply reel and a tape take-up reel rotatable about said pivot means in superimposed relationship, one of said reels having a tubular hub rotatably seated on said pivot means and the other reel having a tubular hub rotatably seated on the hub of said one reel, said pivot means and hubs constituting elongate bearings for the reels, each of said tubular hubs including a radially protruding peripheral flange, the flange on the hub of said one reel being disposed at the hub end adjacent to said end wall portion, and the flange on the hub of said other reel being disposed intermediate the length of said hub, said flanges constituting guide and support surfaces for tape wound on said reels; a coil spring wound upon the hub of said other reel, one end of said spring being secured to one reel and the other end to the other reel, said spring being preloaded to bias the reels for turning in opposite directions; and magnetic tape, each end of said tape being attached to one of said reels and a portion of the tape extending between said reels, said spring biasing the reels in opposite direction and toward an angular position relative to each other in which said tape portion is continuously held taut when and while the tape is being wound from one reel upon the other reel and when and while said reels are at standstill.

2. The cassette according to claim 1 wherein a first axially disposed peripheral wall extends from the flange on the hub of said one reel and a second axially disposed peripheral wall extends from the flange on the hub of said other reel, said walls having substantially equal outer diameters with reference to the rotary axis of said hubs, the peripheral outer surfaces of the walls constituting reel surfaces for winding tape thereabout.

3. The cassette according to claim 2 wherein the wall of said one reel terminates spaced apart from the flange of said other reel thereby eliminating frictional engagement between the two reels.

4. The cassette according to claim 2 wherein each of said axially disposed peripheral walls includes a slot for the passage of the respective tape end and fastening means for attaching said tape end within the reel area circumscribed by the respective axially disposed wall and circumferentially spaced from the respective slot and two tape guiding means, each stationarily mounted spaced apart from the respective reel for guiding the tape to and from said tape portion extending between the two reels; and comprising shock absorbing means for cushioning shocks experienced by the tape ends when fully unwound from either reel, said shock absorbing means including tape guiding means mounted on each reel and disposed to guide the tape so as to increase the length of tape between the fastening means and the slot, thereby correspondingly increasing the available effective length of the tape between the slot and the respective stationarily mounted tape guiding means if and when the reel oscillates about its rotational axis in response to fully unwinding the tape from the respective reel.

5. The cassette according to claim 4 wherein said shock absorbing means comprise a guide member disposed within the reel area circumscribed by the respective axially disposed peripheral wall and the respective slot, said guide member having a curved surface over which the respective tape end is guided between the fastening means and the slot.

6. The cassette according to claim 1 and including fastening means for attaching the ends of the spring to the reels, said fastening means comprising a hook at each end of the spring, and hook receiving means extending from each of said reels, one of said reels including at least one hole in its flange through which the respective receiving means is accessible from the outside of the reel for placing the respective spring hook on the respective receiving means by means of a tool inserted through said hole.

7. The cassette according to claim 6 wherein each of said receiving means comprises a keystoned protrusion for retaining a spring hook slipped thereupon.

8. The cassette according to claim 6 wherein the flange of said one reel comprises a plurality of circumferentially spaced holes, and wherein a hook receiving means is provided adjacent to each one of said holes for slipping one of the spring hooks upon the selected one of said receiving means.

9. A cassette for a sound slide projector, said cassette comprising:

a casing having a top wall, a bottom wall and two side walls and including an upper first compartment for accommodating therein a tape reel assembly and a lower second compartment for accommodating therein a slide, a side wall portion of the casing juxtaposed to the first compartment including a first recess for making the tape accessible for coaction with a tape driving means and a second recess spaced apart from the first recess for making the tape accessible for coaction with a sound head or an erase head, one of the wall portions of the casing adjacent to the second compartment including an elongate slot for removal of a slide out of the second compartment and return of the slide into the second compartment; and releasable slide retaining means biased into pressure engagement with a slide in the second compartment, release of said retaining means freeing the slide for gravity drop out of the second compartment through said slot, said retaining means including an opening in a side wall portion of the cassette casing juxtaposed to the second compartment and a leaf spring, part of the length of said spring being extended through said opening into the second compartment and shaped to engage the adjacent edge of a slide in said compartment, the remaining part of the length of the spring being accessible on the outside of the cassette, application of pressure to said outside spring part causing a deformation of the inside spring part so as to free the slide for gravity drop through the slot.

10. The cassette according to claim 9 wherein said inner spring part has intermediate its length a portion concavely curved with reference to the adjacent casing wall portion, said curved spring part being biased to engage the respective edge of a slide upon insertion thereof into said second compartment of the casing, the end portion of the inner spring part abutting against said adjacent casing wall portion thereby retaining the spring in a biasing position.

11. The cassette according to claim 9 wherein the spring portion located within said opening is shaped to prevent lengthwise displacement of the spring relative to said opening, said shaped spring portion constituting a fulcrum for the spring.

* * * * *